United States Patent
Averett et al.

(10) Patent No.: US 11,503,136 B2
(45) Date of Patent: Nov. 15, 2022

(54) DATA MIGRATION RESERVATION SYSTEM AND METHOD

(71) Applicant: Microsoft Technology Licensing, LLC, Redmond, WA (US)

(72) Inventors: Edward B. Averett, Mercer Island, WA (US); Deepak S. Pemmaraju, Redmond, WA (US); Andrew K. LaChance, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1295 days.

(21) Appl. No.: 15/364,902

(22) Filed: Nov. 30, 2016

(65) Prior Publication Data

US 2018/0152505 A1     May 31, 2018

(51) Int. Cl.
| | |
|---|---|
| *H04L 67/566* | (2022.01) |
| *H04L 67/1097* | (2022.01) |
| *H04L 67/06* | (2022.01) |
| *H04L 47/72* | (2022.01) |

(52) U.S. Cl.
CPC ............ *H04L 67/566* (2022.05); *H04L 47/72* (2013.01); *H04L 67/06* (2013.01); *H04L 67/1097* (2013.01)

(58) Field of Classification Search
CPC ......... H04L 67/16; H04L 67/26; H04L 67/42; H04L 67/1002
USPC ......................................... 709/226–228, 217
See application file for complete search history.

(56) References Cited

U.S. PATENT DOCUMENTS

| | | | | |
|---|---|---|---|---|
| 6,343,313 | B1 * | 1/2002 | Salesky ................. | G06F 3/1415 709/203 |
| 6,996,689 | B2 | 2/2006 | Chatterjee et al. | |
| 7,376,764 | B1 * | 5/2008 | Todd ..................... | G06F 3/0605 710/38 |
| 8,589,651 | B2 | 11/2013 | Kobayashi et al. | |

(Continued)

OTHER PUBLICATIONS

Nahar, Pawan, Abhidnya Joshi, and Alexander Saupp. "Data migration using active cloud engine." In Cloud Computing in Emerging Markets (CCEM), 2012 IEEE International Conference on, pp. 1-4. IEEE, 2012.*

(Continued)

*Primary Examiner* — Oscar A Louie
*Assistant Examiner* — Melaku Y Habtemariam
(74) *Attorney, Agent, or Firm* — Newport IP, LLC; Leonard J. Hope (57) ABSTRACT

Systems and methods for migrating data. One system includes a server including at least one electronic processor. The electronic processor is configured to receive local storage information from a migration client executed by each of a plurality of source devices. The electronic processor is also configured to aggregate the local storage information received for each of the plurality of source devices to determine a migration load, and determine a reservation model based on the migration load. In addition, the electronic processor is configured to issue a first reservation to a first source device included in the plurality of source devices based on the reservation model, the first reservation triggering migration of data stored on the first source device to the at least one remote storage location, and, in response to completion of the first reservation, issue a second reservation based on the reservation model.

21 Claims, 5 Drawing Sheets

(56) References Cited

U.S. PATENT DOCUMENTS

| | | | |
|---|---|---|---|
| 8,793,380 B2 | 7/2014 | Lee | |
| 8,943,032 B1* | 1/2015 | Xu | G06F 17/30079 |
| | | | 707/661 |
| 8,954,574 B1* | 2/2015 | Chheda | G06Q 20/085 |
| | | | 709/220 |
| 9,015,229 B1* | 4/2015 | Raz | G06F 9/5083 |
| | | | 709/203 |
| 2002/0162047 A1* | 10/2002 | Peters | G06F 11/1076 |
| | | | 707/999.2 |
| 2002/0174419 A1 | 11/2002 | Alvarez et al. | |
| 2006/0129771 A1* | 6/2006 | Dasgupta | G06F 3/0605 |
| | | | 711/162 |
| 2008/0201542 A1 | 8/2008 | Maruyama et al. | |
| 2008/0222218 A1* | 9/2008 | Richards | G06F 3/0605 |
| 2009/0006071 A1* | 1/2009 | Dournov | G06F 11/3457 |
| | | | 703/22 |
| 2009/0100435 A1* | 4/2009 | Papaefstathiou | G06F 9/5011 |
| | | | 718/104 |
| 2009/0228589 A1* | 9/2009 | Korupolu | H04L 67/1002 |
| | | | 709/226 |
| 2011/0276821 A1* | 11/2011 | Gudlavenkatasiva | |
| | | | G06F 11/0751 |
| | | | 714/3 |
| 2012/0159021 A1* | 6/2012 | Anantha Padmanaban | |
| | | | H04L 41/12 |
| | | | 710/74 |
| 2012/0311603 A1* | 12/2012 | Kudo | G06F 3/0611 |
| | | | 718/105 |
| 2013/0151683 A1* | 6/2013 | Jain | G06F 3/0611 |
| | | | 709/223 |
| 2014/0359053 A1 | 12/2014 | Bhattacharya et al. | |
| 2015/0019488 A1* | 1/2015 | Higginson | G06F 16/214 |
| | | | 707/634 |
| 2015/0180963 A1* | 6/2015 | Luecke | H04L 67/327 |
| | | | 709/203 |
| 2015/0200833 A1 | 7/2015 | Cutforth et al. | |
| 2015/0212756 A1* | 7/2015 | Coronado | G06F 3/0604 |
| | | | 711/114 |
| 2015/0281356 A1* | 10/2015 | Maturana | G06F 9/5072 |
| | | | 709/217 |
| 2016/0197997 A1 | 7/2016 | Fossen | |

OTHER PUBLICATIONS

Seiwert, et al., "Data Migration to IBM Disk Storage Systems", In Publication of IBM Redbooks, Feb. 2012, 562 pages.

* cited by examiner

DATA MIGRATION RESERVATION SYSTEM AND METHOD

FIELD

Embodiments of the invention relate to migrating data stored locally on a plurality of devices to one or more remote storage locations, and, more particularly, to using a reservation system and method to manage the data migration in a load-balanced fashion.

BACKGROUND

Data stored locally on one or more devices, such as desktop computers, laptop computers, tablet computers, mobile devices, and the like, may be transferred or migrated to a remote cloud storage service for security purposes, redundancy purposes, accessibility purposes, or a combination thereof. Typically, migration of local data to remote resources requires manual action by computer users, system administrators, or both.

SUMMARY

When data stored on a group of devices needs to be migrated, migrating the data can overload the networks or cause other technical problems. This is especially true for devices associated with a common local area network of an enterprise. Similarly, migrating a large amount of data from a group of devices may degrade the responsiveness and performance of the cloud storage service that may impact both migration and access to and collaboration on data already stored to the cloud storage service. Thus, administrators may spend time and resources attempting to manually complete a data migration without negatively impacting network performance. However, tracking and controlling large data migrations is difficult. Thus, an administrator may need to manually initiate migration at particular source devices through customized scripts and other logic and may not be able to quickly or adequately respond to any problems that occur during the migration.

Thus, embodiments of the invention provide, among other things, systems and methods to manage migration of data stored locally on a plurality of devices. As described in more detail below, executables stored on the plurality of devices may report data needing migration to a migration manager associated with the cloud storage service. The migration manager uses the received information to determine a footprint of data needing migration across the devices. The migration manager uses the footprint, representing a migration load, and, optionally, other data, such as service load, availability, connection speed, and the like, to issue reservations to the plurality of devices. The reservations allow the migration to be completed without administrator or user interaction and without network overload or service degradation. When received by a device, a reservation triggers the device to initiate data migration. The reservation may also specify parameters for performing the migration, such as the files or folders to migrate, a maximum amount to data to upload, and the like. The reservation may also include an expiration time that controls when migration stops regardless of whether data has been successfully migrated or even started. When a reservation is complete or expires, the migration manager may issue another reservation based on (i) the load the migration associated with the new reservation would put on the network and storage service and (ii) the footprint. The migration manager may repeat this process until the data stored across the devices has been migrated.

The migration manager may also provide a dashboard representing the progress of the migration within a user interface. The migration manager may also use the progress of the migration to dynamically modify reservations. For example, the migration manager may update existing reservations and issuing new reservations based on the progress of the migration. For example, one embodiment provides a system for migrating data. The system includes a server including at least one electronic processor. The at least one electronic processor is configured to receive local storage information from a migration client executed by each of a plurality of source devices, the local storage information identifying data stored locally on each of the plurality of source devices to be migrated to at least one remote storage location, aggregate the local storage information received for each of the plurality of source devices to determine a migration load, and determine a reservation model based on the migration load. The at least one electronic processor is also configured to issue a first reservation to a first source device included in the plurality of source devices based on the reservation model, the first reservation triggering migration of data stored on the first source device to the at least one remote storage location, and, in response to completion of the first reservation, issue a second reservation based on the reservation model.

Another embodiment provides a source device. The source device includes at least one non-transitory storage device storing data to be migrated to at least one remote storage location and at least one electronic processor. The at least one electronic processor is configured to transmit local storage information to a remote computer, transmit online time for the source device to the remote computer, and transmit average upload speed for the source device to the remote computer. The at least one electronic processor is also configured to receive a reservation from the remote computer, the reservation including an expiration time, and, in response to receiving the reservation, transmit the data to be migrated to the at least one remote storage location. When the expiration time occurs, the at least one electronic processor is also configured to stop transmitting the data to the at least one remote storage location.

Yet another embodiment provides a method of migrating data. The method includes (i) receiving, with an electronic processor, local storage information from a migration client executed by each of a plurality of source devices, the local storage information identifying data stored on each of the plurality of source devices to be migrated to at least one remote storage location, (ii) aggregating, with the electronic processor, the local storage information received for each of the plurality of source devices to determine a migration load, and (iii) determining, with the electronic processor, a reservation model based on the migration load. The method also includes issuing a first reservation to a first source device included in the plurality of source devices based on the reservation model, wherein the first reservation triggers migration of data stored on the first source device to the at least one remote storage location and includes an expiration time. In addition, the method includes, in response to completion of the first reservation or occurrence of the expiration time, issuing a second reservation based on the reservation model.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
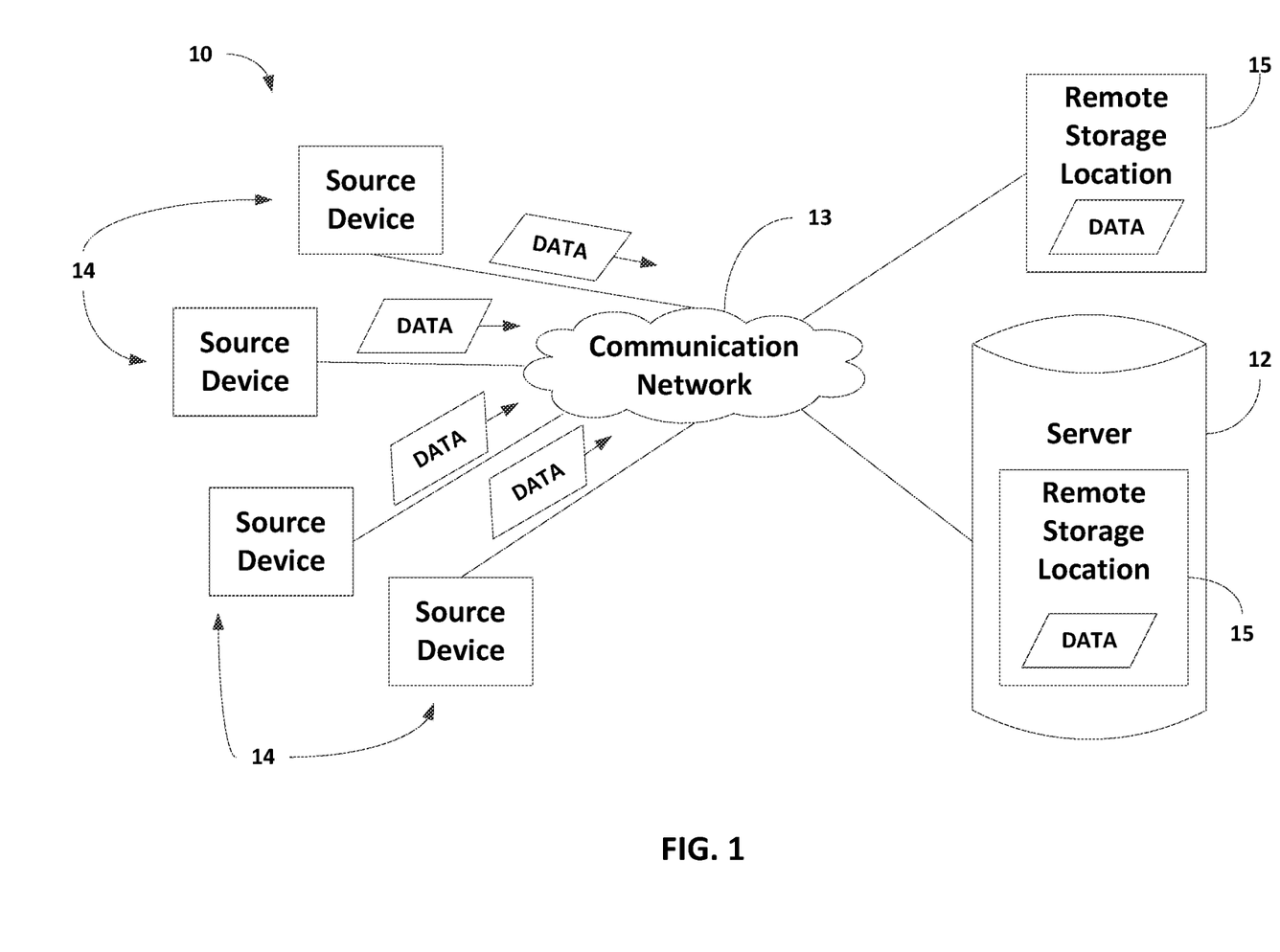
FIG. 1 schematically illustrates a system for migrating data according to one embodiment of the invention.

FIG. 1 schematically illustrates a system 10 for migrating data. As illustrated in FIG. 1, the system 10 includes a remote computer or server 12 and a plurality of source devices 14 (referred to herein collectively as "the plurality of source devices 14" and individually as "a source device 14"). The server 12 and the plurality of source devices 14 communicate over one or more wired or wireless communication networks 13. Portions of the communication networks 13 may be implemented using a wide area network, such as the Internet, a local area network, such as a Bluetooth™ network or Wi-Fi, and combinations or derivatives thereof. The plurality of source devices 14 may be associated with a common domain, such as an enterprise. However, in other embodiments, the plurality of source devices 14 may represent individual consumers of a cloud storage service unrelated to a common enterprise or sharing of a common local area network or the like. It should be understood that the server 12 may communicate with any number of source devices 14 and four source devices 14 are illustrated in FIG. 1 purely for illustrative purposes. Also, in some embodiments, a source device 14 may communicate with the server 12 through one or more interim devices.

As described in more detail below, the plurality of source devices 14 represent a collective source of data to be migrated to one or more remote storage locations 15, and the server 12 manages migration of this collective data to the remote storage locations 15. Each remote storage location 15 may include non-transitory, computer-readable medium for storing data. As illustrated in FIG. 1, in some embodiments, the server 12 includes one or more remote storage locations 15. Alternatively or in addition, the remote storage locations 15 may be included on devices separate from the server 12.

Figure 2:
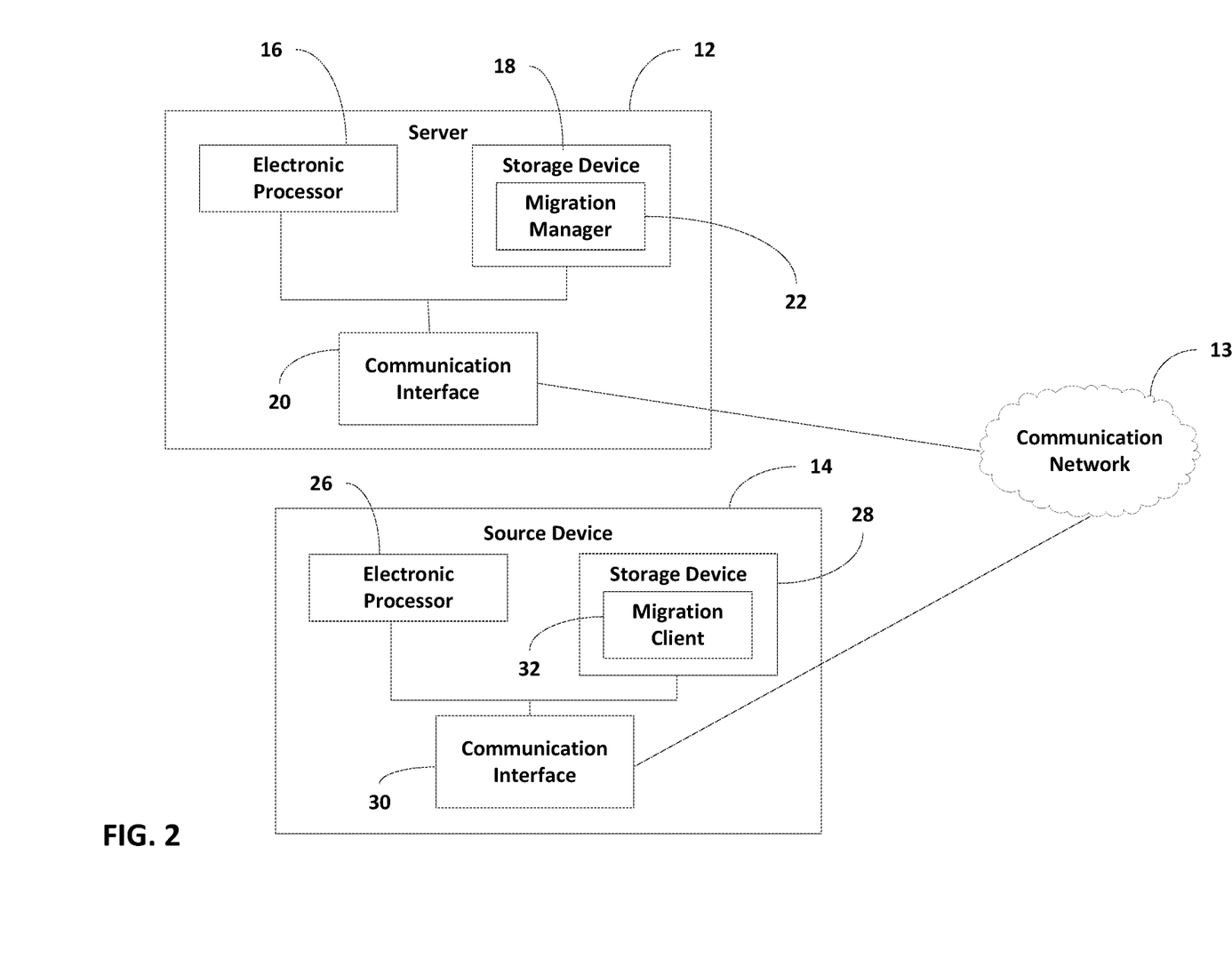
FIG. 2 schematically illustrates a source device and a server included in the system of FIG. 1 according to one embodiment of the invention.

As illustrated in FIG. 2, the server 12 includes an electronic processor 16 (for example, a microprocessor, application-specific integrated circuit (ASIC), or another suitable electronic device), a storage device 18 (for example, a non-transitory, computer-readable storage medium), and a communication interface 20, such as a transceiver, for communicating over the communication networks 13 and, optionally, one or more additional communication networks or connections. The electronic processor 16, the storage device 18, and the communication interface 20 communicate over one or more communication lines or buses. It should be understood that the server 12 may include additional components than those illustrated in FIG. 1 in various configurations and may perform additional functionality than the functionality described in the present application. For example, in some embodiments, the functionality described herein as being performed by the server 12 may be distributed among multiple devices, such as multiple servers operated within a cloud environment.

The electronic processor 16 executes instructions stored in the storage device 18. In particular, as illustrated in FIG. 1, the storage device 18 stores a migration manager 22. The migration manager 22 is a software application executable by the electronic processor 16. As described below, the migration manager 22, when executed by the electronic processor 16, communicates with the plurality of source devices 14 over the communication networks 13 (through the communication interface 20) to manage migration of data stored locally on the plurality of source devices 14 to the one or more remote storage locations 15. It should be understood that the functionality described herein as being performed by the migration manager 22 may be distributed among multiple software applications.

The plurality of source devices 14 includes one or more desktop computers, laptop computers, tablet computers, terminals, smart telephones, smart televisions, smart wearables, servers, databases, other types of computing devices, or a combination thereof. As illustrated in FIG. 2, similar to the server 12, each of the plurality of source devices 14 includes an electronic processor 26 (for example, a microprocessor, application-specific integrated circuit (ASIC), or another suitable electronic device), a storage device 28 (for example, a non-transitory, computer-readable storage medium), and a communication interface 30, such as a transceiver that communicates with the server 12 over the communication networks 13 and, optionally, one or more other communication networks or connections. One or more of the plurality of source devices 14 may include additional components than those illustrated in FIG. 2 in various configurations and may perform additional functionality than the functionality described in the present application.

As illustrated in FIG. 2, the storage device 28 of each source device 14 stores a migration client 32. The migration client 32 is a software application executable by the electronic processor 26. In some embodiments, the migration client 32 (or the functionality described as being performed by the migration client 32) is included in a synchronization client stored on each source device 14 that manages migration of data stored locally on a source device 14 (for example, in the storage device 28) to the one or more remote storage locations 15. However, in other embodiments, the migration client 32 may be separate from such a synchronization client. As described in more detail below, the electronic processor 26 executes the migration client 32 to communicate with the server 12 to manage migration of data stored locally on the source device 14 (for example, in the storage device 28) to the one or more remote storage locations 15. It should be understood that the functionality described herein as being performed by the migration client 32 may be distributed among multiple software applications. Also, it should be understood that, in some embodiments, the migration client 32 stored on a particular source device 14 may communicate with and manage a set of source devices 14, such that a migration client 32 is not individually stored and executed on each of the plurality of source devices 14.

As described above, locally-stored data on one of the plurality of source devices 14 may be migrated to a cloud storage service provided through the server 12 to provide security, redundancy, accessibility, or a combination thereof. Migrating a large amount of locally-stored data, however, may impact network performance for the source devices 14 as well as the performance of the cloud storage service. Accordingly, to manage data migration, the migration manager 22 executed by the server 12 communicates with the migration clients 32 executed by the source devices 14 to plan and manage a migration.

Figure 3:
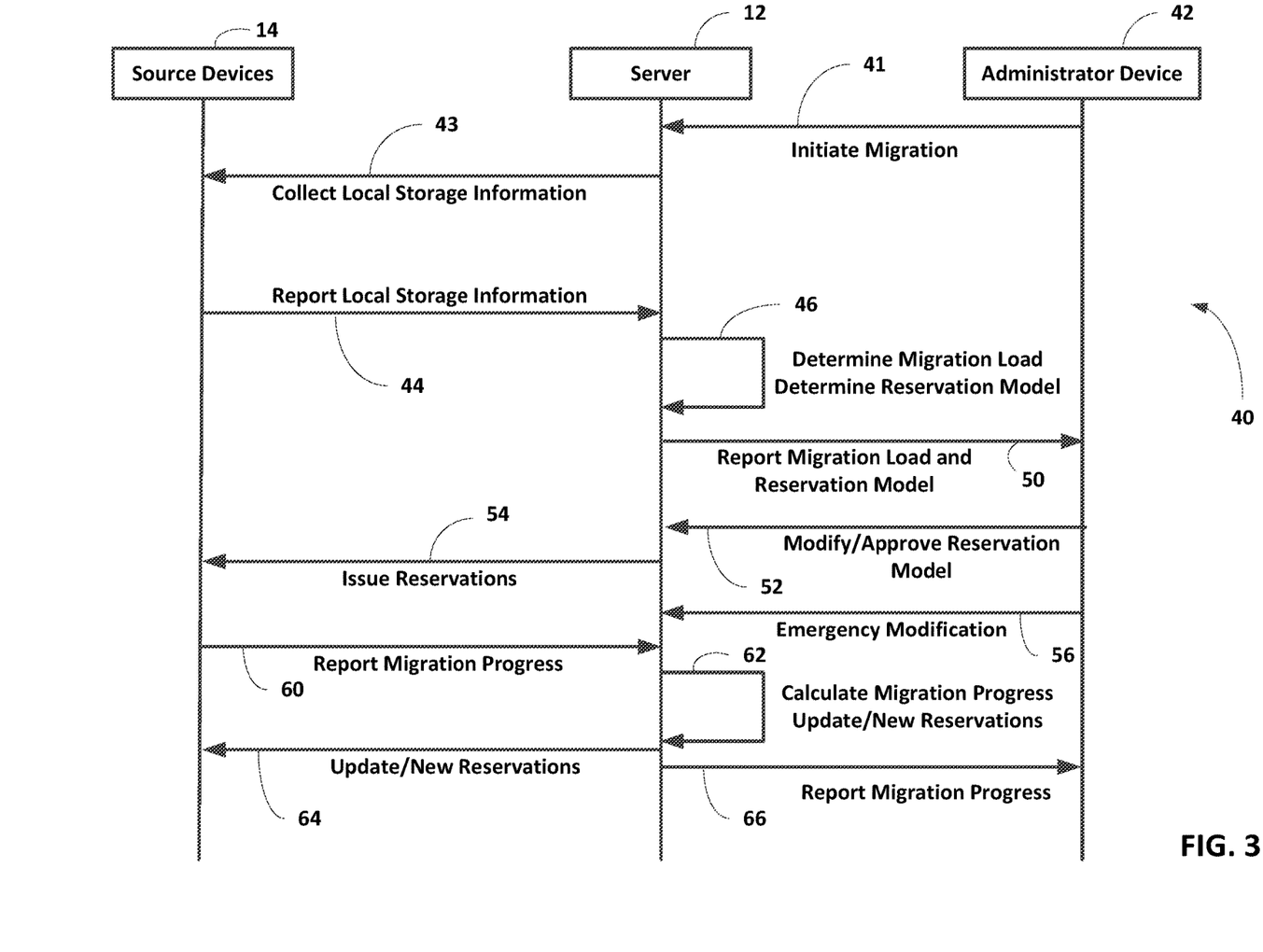
FIG. 3 is a sequence diagram illustrating a method of managing data migration performed by the system of FIG. 1 according to one embodiment of the invention.

For example, FIG. 3 is a sequence diagram illustrating a method 40 of managing migration of data stored locally on the plurality of source devices 14 to at least one of the one or more remote storage locations 15 performed by the migration manager 22 and the migration clients 32. As illustrated in FIG. 3, the method 40 includes initiating data migration for the plurality of source devices 14 (at 41). When the source devices 14 are associated with a common enterprise, the data migration may be initiated when the enterprise opts into or turns on a migration mode of the enterprise's cloud storage service indicating that data stored locally on the plurality of source devices 14 should be migrated to the one or more remote storage locations 15. Similarly, when the source devices 14 are not associated with a common enterprise, the data migration may be initiated when the cloud service provider opts into or turns on a migration mode of the cloud storage service. In either situation, the migration manager 22 executed by the electronic processor 16 of the server 12 may receive a signal from an administrator device 42 (for example, a desktop computer, tablet computer, or the like) communicating with the server 12 (for example, over the communication networks 13) to initiate the data migration. For example, the administrator device 42 may display a user interface that allows an administrator to turn on a migration mode.

As illustrated in FIG. 3, the method 40 also includes collecting, with the migration manager 22, local storage information for each of the plurality of source devices 14 (at 43). The local storage information identifies data stored on each of the plurality of source devices 14 to be migrated to the one or more remote storage locations 15. In some embodiments, the local storage information identifies a number of files to be migrated, a number of folders to be migrated (a depth of data to be migrated), a size of the data to be migrated, or a combination thereof. The local storage information may be limited to data stored in a predetermined listing of folders or memory locations. For example, the local storage information may be limited to data stored in a commonly used data storage location, such as "documents" folders, "photos" folders, "music" folders, "download" folders, "desktop" or "users" folders, and certain program files where users commonly create and store files and may exclude any data already migrated to the cloud storage service.

In some embodiments, the migration client 32 executed by the electronic processor 26 of each source device 14 is configured to scan the storage device 28 of the source device 14 and report the local storage information to the migration manager 22. The migration manager 22 may request such a scan and the local storage information from the migration clients 32 when needed, such as when the data migration is initiated. For example, the migration manager 22 may issue a notification of the migration mode, and the migration clients 32 may access the notification of the migration mode during periodic check-ins with the migration manager 22 according to configurable refresh rate. In some embodiments, the notification may also instruct the migration clients 32 what storage locations to scan (for example, what folders to include), what types of files to scan, what data to report, or a combination thereof. Alternatively or in addition, the migration clients 32 may be configured to periodically send local storage information to the migration manager 22 such that the migration manager 22 does not directly initiate the scanning and reporting of local storage information.

In some embodiments, in addition to the local storage information, the migration manager 22 receives an online time, a connectivity speed, or a combination thereof for one or more of the plurality of source devices 14. The online time may represent time periods when a particular source device 14 is turned on, actively receiving input from a user, actively communicating with an external device or system (such as the communication networks 13), or a combination thereof. The connectivity speed may represent a connection or upload speed of a source device 14 (for example, to the server 12 over the communication networks 13). In some embodiments, the migration manager 22 receives the online time, the connectivity speed, or both from the migration client 32. However, in other embodiments, a separate software application executed on the source devices 14 or a separate device (such as a network manager) provides the online time, connectivity speed, or both to the migration manager 22. As described above for the local storage information, the migration manager 22 may request the online time, the connectivity speed, or both, may periodically receive this information from one or more sources, or may determine this information locally. Also, in some embodiments, the migration manager 22 receives an individual online time, connectivity speed, or both for an individual source device 14, a group of source devices 14, or a combination thereof. For example, the migration manager 22 may receive an aggregate online time, a connectivity speed, or both for a set of source devices 14, such as an average online time, an average connectivity speed, or the like.

As illustrated in FIG. 3, in response to receiving the local storage information for the plurality of source devices 14 (at 44), the migration manager 22 aggregates the local storage information to determine a migration load (at 46). The migration load represents a total amount of data needing migration across the plurality of source devices 14. For example, the migration load may represent a number of files, a number of folders, a data size, or a combination thereof that needs migration over a particular number of source devices 14. The migration manager 22 also determines a reservation model based on the migration load (at 46). When the migration manager 22 receives online time, connectivity speed, or both, the migration manager 22 may determine the reservation model based on these additional inputs.

The reservation model identifies one or more migration parameters. The migration parameters may include a time for performing data migration (for example, during night hour or other low demand hours), a maximum amount of data to migrate per time period (for example, per date, per hours, and the like), a migration rate (for example, a maximum upload data rate), data to migrate, a migration priority (for example, complete migration as fast as possible, complete migration without impacting network connectivity, and the like), a listing of devices included in the plurality of source devices 14 to migrate, or a combination thereof. The migration manager 22 may be configured to determine default migration parameters. For example, the migration manager 22 may be configured to determine network utilization (for example, based on the online times, connectivity speeds, or a combination thereof) and determine an amount of data per time period to migrate based on network utilization such that the data migration does not degrade network utilization. In some embodiments, the migration parameters may also be based on signals received from the administrator device 42.

As described in more detail below, the migration manager 22 issues reservations based on the reservation model and, in particular, based on the migration parameters associated with the reservation model. For example, based on the determined amount of data per time period to migrate, the migration manager 22 may determine data to migrate to fulfill the determined amount of data per time period. As one example, if the migration manager 22 determines that one megabyte of data may be migrated per second without interfering with normal network connectivity, the migration manager 22 determines which source devices 14 to initially migrate data from and what data to migrate from such identified source devices 14 to fulfill this amount. In some embodiments, the migration manager 22 may prioritize source devices 14, data, or both such that particular source devices 14 or particular files or folders are initially migrated. For example, the migration manager 22 may prioritize source devices associated with executives or other high-priority individuals of an enterprise, may prioritize document files over music files, photographs, or make other decisions regarding the importance or priority of particular files. In other embodiments, the migration manager 22 is configured to order or prioritize source devices or data based on how local storage information was received, online times, connectivity speeds, source device identifiers (for example, a numeric ordering of source devices based on unique identifiers associated with the source devices 14), and the like.

As illustrated in FIG. 3, in some embodiments, the migration manager 22 reports the migration load and the reservation model to the administrator device 42 (at 50). The migration load and the reservation model (for example, one or more migration parameters included in the reservation model) may be displayed to an administrator through the administrator device 42 for review, optional modification, and approval. The user interface may include one or more graphical representations of the migration load. For example, the user interface may include a histogram that displays a number of source devices having a predetermined amount or range of locally-stored data to migrate (for example, based on the collected local storage information, one hundred source devices have five gigabyte to ten gigabyte of data to migration). Additionally or alternatively, the user interface may display the migration load textually.

The user interface may also include one or more selection mechanisms (for example, a button, a check box, a radio button, and the like) for modifying a migration parameter. For example, an administrator may want to limit data migration to particular hours of the day, may want to exclude particular file types, folders, or source devices 14 from the migration, may want to adjust the default amount of data to migrate per time period, may want to prioritize particular source devices 14 or file types, and the like. The user interface may also include a selection mechanism for approving the reservation model. In some embodiments, the user interface for modifying and approving the reservation model may be generated by the migration manager 22 (or a separate software application) and made accessible to the administrator device 42 using a browser application or a specialized software application. Also, in some embodiments, an administrator may provide migration parameters as part of initiating the migration as an alternative or in addition to providing or modifying migration parameters after the reservation model is determined. In addition, in some embodiments, migration parameters provided or modified by an administrator for a previous migration may be stored and applied to future migrations. Furthermore, it should be understood that the same or different administrator devices 42 may be used to initiate a migration and approve a reservation model.

In response to determining the reservation model (and receiving any modification or approval of the reservation model through the user interface (at 52) as described above), the migration manager 22 issues a first reservation to a first source device 14 based on the reservation model (at 54). The first reservation triggers migration of data stored locally on the first source device 14 to the one or more remote storage locations 15. In particular, when the first source device 14 receives the first reservation (for example, as part of a periodic check-in with the migration manager 22 according to a configurable refresh rate), the first source device 14 begins migrating or transmitting data according to the first reservation. For example, the first reservation may specify data stored locally on the first source device 14 to migrate to the one or more remote storage locations 15. Alternatively or in addition, the first reservation may specify a migration speed for migrating data to the one or more remote storage locations 15. Also, in some embodiments, the first reservation identifies a time period for migrating data to the one or more remote storage locations 15 (for example, between the hours of 5:00 p.m. and 4:00 a.m.). In addition, the first reservation may include an expiration time. The expiration time may be a timestamp (for example, Dec. 12, 2016 or 9:00 p.m. on Dec. 12, 2016). Alternatively or in addition, the expiration time may be a total migration time (for example, 12 hours of migration). When the expiration time occurs (for example, the time stamp occurs or the total migration time is reached), the first source device 14 stops migration of data to the one or more remote storage locations 15 as specified in the first reservation regardless of whether that migration has completed. Accordingly, the expiration time may be used to as a check on data migration and to prevent rouge source devices from continuing migration beyond a particular time. For example, when a source device 14 does not receive a reservation until after the expiration time has occurred (for example, the source device 14 is offline and does not check-in with the migration manager until after the expiration time has occurred), the source device 14 may disregard the reservation based on the expiration time.

In some embodiments, the first reservation also modifies a refresh rate of the first source device. As noted above, the refresh rate may specify how often a source device 14 (a migration client 32) checks-in with the migration manager 22 to obtain notifications or other service changes. During migration mode, it may be useful for a source device 14 to check-in with the migration manager 22 more frequently to keep a source device 14 updated on the current status of the migration and any changes in migration instructions. Accordingly, the first reservation may increase a refresh rate of the first source device. Similarly, the first reservation may set other operating parameters of the first source device. For example, the first reservation may specify a new power consumption mode for the first source device 14 that prevents the first source device 14 from entering a sleep mode or other low power consumption mode that would otherwise limit or prevent data migration while the first source device 14 is not being actively used by a user. In particular, rather than enter a sleep mode during periods of inactivity, the first source device 14 may continue to migrate data as specified in the first reservation.

It should be understood that, in some embodiments, the migration manager 22 initially issues reservations to a subset of the plurality of source devices 14 or all of the plurality of source devices 14. However, even when the migration manager 22 issues a reservation to more than one source device 14 concurrently, the reservation issued to each source device 14 may vary. For example, the migration manager 22 may issue a source device 14 with a low connectivity speed with a reservation that identifies a lower migration rate than a source device with a higher connectivity speed.

Upon receiving the first reservation, the first source device 14 initiates data migration as requested in the first reservation. The first source device 14 may proceed with the data migration until the migration is complete or until the expiration time occurs. In some embodiments, an administrator may also issue an emergency modification (a stop or slow down) request for the data migration (for example, through the administrator device 42) (at 56). In these situations, the migration manager 22 receives the request and may modify issued reservations to fulfill the request (for example, stopping or reducing existing migration by updating an expiration time or issued reservations or limiting or blocking new reservations).

The first source device 14 may report the progress of the migration (for example, start, percentage complete, completion, and the like) to the migration manager 22 (at 60). Alternatively or in addition, the migration manager 22 may directly track progress of the migration and, thus, may directly determine when the migration has started or completed without relying on progress reports from the first source device 14. When the first source device 14 completes migration or the expiration time occurs, the first source device 14 may also return to a default or previous operating state, such as by returning to a default or previously-assigned refresh rate or to a default or previously-assigned power consumption state.

Based on the tracked progress of the migration performed with respect to individual reservations, the migration manager 22 may calculate the progress of the data migration (at 62) and dynamically modify (update existing or issue new) reservations based on the progress (at 64). For example, as noted above, in some embodiments, the migration manager 22 initially issues reservations to only a subset of the plurality of source devices 14, such as to limit the impact of the migration on network performance. In these situations, when the first source device 14 completes migration as requested by the first reservation (or the expiration time occurs), the migration manager 22 issues a second reservation based on the reservation model to a second source device 14. Thus, in this situation, the migration manager 22 may issue an initial set of reservations according to the reservation model and may issue additional reservations as reservations included in the initial set of reservations are completed in load-balanced fashion, such as in a round-robin fashion (a sequential process wherein a reservation is issued after another reservation is completed or expires). Again, as noted above, the second reservation may differ from the first reservation in one or more ways. Issuing reservations in this way allows the migration manager 22 to control data migration as compared to allowing all of the source devices 14 to start data migration or perform data migration at preset times or dates, which may not take into account the status of migration performed by other source devices 14.

Also, depending on the real-time progress of the migration, the migration manager 22 may update an issued reservation to increase an upload rate, decrease an upload rate, and the like. Similarly, depending on the real-time process of the migration, the migration manager 22 may detect an emergency situation where the migration associated with the first reservation should be stopped before completion. In this situation, the migration manager may be configured to dynamically modify the first reservation by modifying an expiration time specified in the first reservation. Also, depending on the real-time process of the migration, the migration manager 22 may be configured to issue a third reservation to a third source device included in the plurality of source devices based on the reservation model. For example, when network connectivity allows, the migration manager 22 may issue the third reservation to increase data migration as set forth in the reservation model.

In some embodiments, the migration manager 22 is also configured to report the progress of data migration to an administrator (at 66). For example, the migration manager 22 may generate a user interface representing the progress of the migration that is accessible by the administrator device 42 through a browser application or a specialized software application. The user interface may display a percentage of data migrated, a percentage of data yet to be migrated, a number of files migrated, a number of files yet to be migrated, a number of folders migration, a number of folders yet to be migrated, a number of source devices completing migration, a number of source devices with data yet to be migrated, a real-time aggregated (for example, average) upload rate, a total upload time, or a combination thereof. This information may be displayed within the user interface in a textual format, visual format, or a combination thereof. In some embodiments, an administrator may modify the existing reservation model (or existing reservations) based on the provided migration process as described above when the reservation model is initially determined and approved. The user interface may also inform the administrator when the entire data migration (across the plurality of source devices 14) is complete.

As noted above, in some embodiments, the plurality of source devices 14 may represent a group of users associated with a common enterprise or a ground of unrelated users, such as a group of consumers of a cloud storage service. When the plurality of source devices 14 includes such a group of unrelated users, an individual user may have control over data migration. For example, in some embodiments, the migration manager 22 may receive local storage information from the plurality of source devices 14 and aggregate the local storage information as described above to determine one or more source devices 14 that could be included as part of a migration. In particular, the migration manager may identify source devices 14 that have previously-started migrating data but the migration is not complete, source devices 14 that have available remote storage, source devices 14 that have less than a predetermined maximum amount of data or folders to migrate, source devices 14 that have particular software applications or application settings, or a combination thereof. After identifying such source devices 14, the migration manager 22 may prompt a user associated with the one or more source devices 14 to confirm whether he or she wants to receive a reservation and, optionally, what data he or she wants to migrate.

Figure 4:
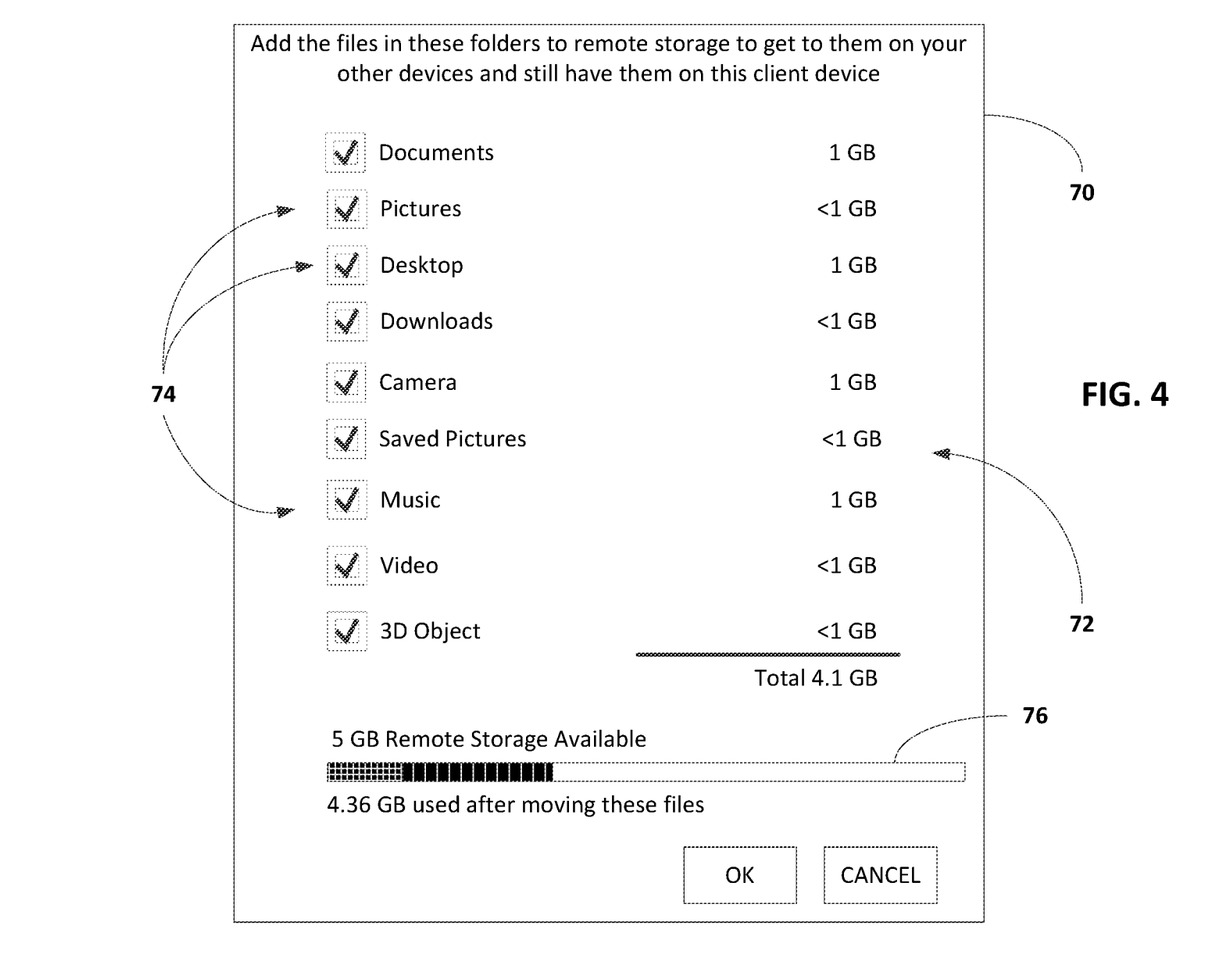
FIG. 4 illustrates a user interface displaying migration parameters according to one embodiment of the invention.

In other embodiments, before or after receiving the local storage information, a user associated with a source device 14 may specify what data he or she would like to migrate, which the migration manager 22 uses to determine the migration model and issue reservations as described above. For example, FIG. 4 illustrates a user interface 70 that may be displayed on a source device 14 (generated through execution of the migration client 32) to prompt a user for one or more migration parameters. For example, the user interface 70 may allow a user to select files or folders for migration. In particular, as illustrated in FIG. 4, the user interface 70 may include a list of available files or folders 72, wherein each listed file or folder includes a checkbox 74 or other selection mechanism selectable by the user to include or exclude the file or folder from the migration process. The user interface 70 may also include a total storage amount currently selected for migration and, optionally, an amount of remote storage available. As illustrated in FIG. 4, this information or a portion thereof may be displayed graphically, such as by a bar graph 76. In response to a user selecting particular files or folders to migrate (and when sufficient remote storage is available), the migration manager 22 may issue a reservation to the source device 14 as described above that limits the migration to those files or folders selected by the user.

Figure 5:
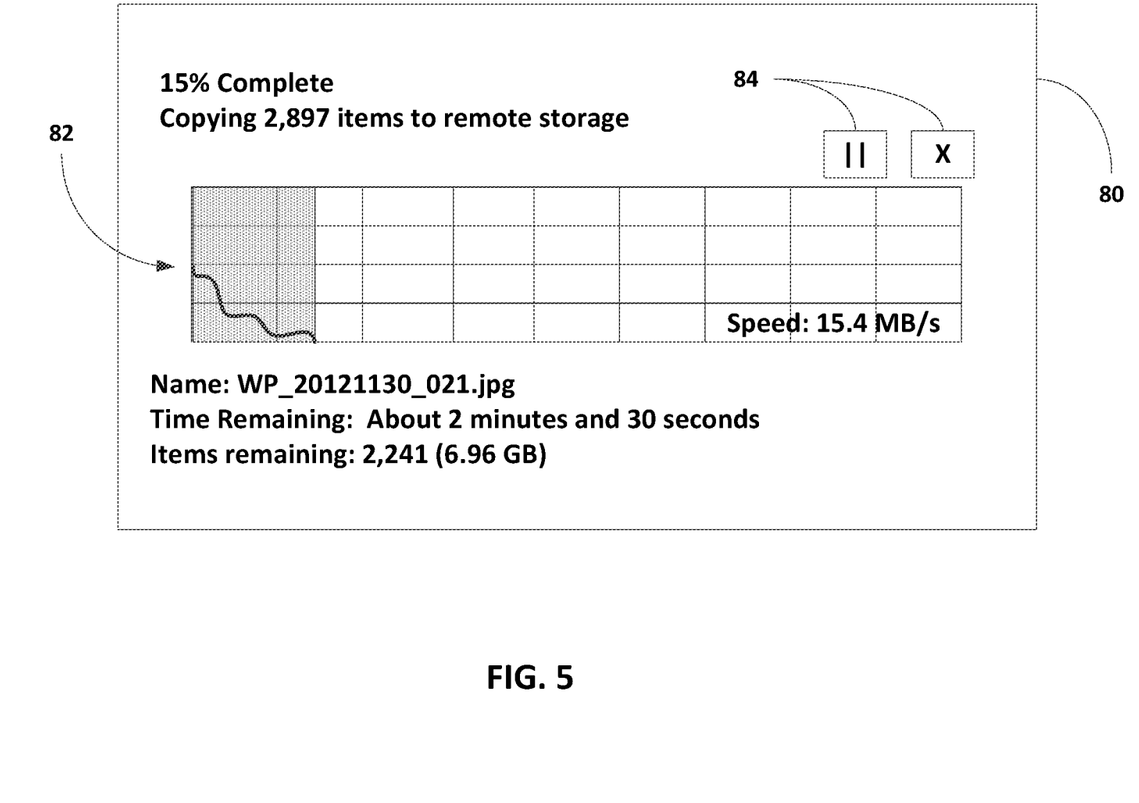
FIG. 5 illustrates a user interface displaying migration progress according to one embodiment of the invention.

The migration manager 22 may also provide progress information to a user of the source device 14. For example, FIG. 5 illustrates a user interface 80 that indicates (for example, textually, graphically, or both) what percentage of the data migration from the source device 14 has been completed. In particular, as illustrated in FIG. 5, the user interface 80 may include a bar graph 82 showing a percentage complete. Alternatively or in addition, the user interface 80 may specify storage space available, a migration time, a time to completion, a number of files or folders migrated, a number of files or folders yet to be migrated, a file or folder currently be migrated, any migration errors (for example, file locks, move conflicts, and the like), or a combination thereof. In some embodiments, the user interface 80 also identifies a current or aggregated (for example, average) upload speed (for example, 15.4 megabytes per second). As illustrated in FIG. 5, the upload speed may be specified textually, graphically, or both. In some embodiments, the user interface 80 may also include one or more selection mechanisms, such as one or more buttons 84, that allow a user to pause or cancel the data migration. It should be understood that the above controls and information provided at the source device 14 may be used when data is migrated from a group of unrelated users or from a group of related users. Also, similar controls and information may be provided to an administrator, such as an administrator of an enterprise or an administrator of a cloud storage service, as part of initiating a migration, approving a reservation model, or tracking progress of data migration as described above.

Thus, embodiments of the invention provide, among other things, systems and methods migrating data. Various features and advantages of some embodiments are set forth in the following claims.

What is claimed is:

1. A system for migrating data, the system comprising:
a server including at least one electronic processor configured to
receive local storage information from a migration client executed by each of a plurality of source devices, the local storage information identifying data stored locally on each of the plurality of source devices to be migrated to at least one remote storage location,
aggregate the local storage information received for each of the plurality of source devices to determine an aggregated migration load, the aggregated migration load representing a total amount of data stored locally on the plurality of source devices to be migrated from the plurality of source devices, the total amount of data represented as at least one of a total number of files to be migrated across the plurality of source devices, a total number of folders to be migrated across the plurality of source devices, and a total size of the data to be migrated across the plurality of source devices,
determine a reservation model based on the aggregated migration load, including determining network utilization, determining an amount of data per time period to migrate based on network utilization, and determining an order of the plurality of source devices based on the amount of data per time period to migrate,
issue a first reservation to a first source device included in the plurality of source devices based on the reservation model, the first reservation triggering migration of data stored on the first source device to the at least one remote storage location and including a migration speed for migrating the data stored on the first source device to the at least one remote storage location, and
in response to completion of the first reservation, issue a second reservation based on the reservation model.

2. The system of claim 1, wherein the at least one electronic processor is further configured to receive an online time for at least one of the plurality of source devices and is configured to determine the reservation model based the local storage information and the online time for the at least one of the plurality of source devices.

3. The system of claim 1, wherein the at least one electronic processor is further configured to receive an upload speed for at least one of the plurality of source devices and is configured to determine the reservation model based the local storage information and the upload speed for the at least one of the plurality of source devices.

4. The system of claim 1, wherein the local storage information identifying the data stored on each of the plurality of source devices to be migrated identifies at least one selected from a group consisting of a number of files to be migrated, a number of folders to be migrated, and a size of the data to be migrated.

5. The system of claim 1, wherein the first reservation identifies a subset of the data stored locally on the first source device to migrate to the at least one remote storage location.

6. The system of claim 1, wherein the first reservation identifies a time period for migrating the data stored locally on the first source device to the at least one remote storage location.

7. The system of claim 1, wherein the first reservation identifies an expiration time for the first reservation, wherein upon occurrence of the expiration time the first source device stops migration of the data stored locally on the first source device to the at least one remote storage location, the expiration time including at least one of a timestamp and a total migration time.

8. The system of claim 1, wherein the first reservation modifies a refresh rate of the first source device.

9. The system of claim 1, wherein the at least one electronic processor is further configured to track progress of migration of the data stored locally on the first source device to the at least one remote storage location and display a user interface representing the progress.

10. The system of claim 9, wherein the at least one electronic processor is further configured to modify the first reservation based on the progress.

11. The system of claim 10, wherein the at least one electronic processor is configured to dynamically modify the first reservation based on the progress by modifying an expiration time specified in the first reservation.

12. The system of claim 10, wherein the at least one electronic processor is further configured to issue a third reservation to a third source device included in the plurality of source devices based on the progress and the reservation model.

13. The system of claim 1, wherein the plurality of source devices are associated with an enterprise.

14. A method of migrating data comprising:
receiving, with an electronic processor, local storage information from a migration client executed by each of a plurality of source devices, the local storage information identifying data stored on each of the plurality of source devices to be migrated to at least one remote storage location;
aggregating, with the electronic processor, the local storage information received for each of the plurality of source devices to determine an aggregated migration load, the aggregated migration load representing a total amount of data stored locally on the plurality of source devices to be migrated from the plurality of source devices, the total amount of data represented as at least one of a total number of files to be migrated across the plurality of source devices, a total number of folders to be migrated across the plurality of source devices, and a total size of the data to be migrated across the plurality of source devices;
determining, with the electronic processor, a reservation model based on the aggregated migration load, including determining network utilization, determining an amount of data per time period to migrate based on network utilization, and determining an order of the plurality of source devices based on the amount of data per time period to migrate;
issuing a first reservation to a first source device included in the plurality of source devices based on the reservation model, the first reservation triggering migration of data stored on the first source device to the at least one remote storage location and including an expiration time; and
in response to completion of the first reservation or occurrence of the expiration time, issuing a second reservation based on the reservation model.

15. The method of claim 14, further comprising generating a user interface representing the reservation model, the user interface including at least one selection mechanism for modifying a parameter of the reservation model.

16. The system of claim 1, wherein the at least one electronic processor is further configured to provide a user interface displaying the aggregated migration load the reservation model for at least one selected from a group consisting of review, modification, and approval.

17. A non-transitory computer-readable medium having instructions stored thereupon which, when executed by a processor, cause the processor to:
receive local storage information from a migration client executed by each of a plurality of source devices, the local storage information identifying data stored locally on each of the plurality of source devices to be migrated to at least one remote storage location;
aggregate the local storage information received for each of the plurality of source devices to determine an aggregated migration load, the aggregated migration load representing a total amount of data stored locally on the plurality of source devices to be migrated from the plurality of source devices, the total amount of data represented as at least one of a total number of files to be migrated across the plurality of source devices, a total number of folders to be migrated across the plurality of source devices, and a total size of the data to be migrated across the plurality of source devices;
determine a reservation model based on the aggregated migration load, including determining network utilization, determining an amount of data per time period to migrate based on network utilization, and determining an order of the plurality of source devices based on the amount of data per time period to migrate;
issue a first reservation to a first source device included in the plurality of source devices based on the reservation model, the first reservation triggering migration of data stored on the first source device to the at least one remote storage location and including a migration speed for migrating the data stored on the first source device to the at least one remote storage location; and
in response to completion of the first reservation, issue a second reservation based on the reservation model.

18. The non-transitory computer-readable medium of claim 17, having further instructions stored thereupon to generate a user interface representing the reservation model, the user interface including at least one selection mechanism for modifying a parameter of the reservation model.

19. The non-transitory computer-readable medium of claim 17, having further instructions stored thereupon to receive an online time for at least one of the plurality of source devices and is configured to determine the reservation model based the local storage information and the online time for the at least one of the plurality of source devices.

20. The non-transitory computer-readable medium of claim 17, having further instructions stored thereupon to receive an upload speed for at least one of the plurality of source devices and is configured to determine the reservation model based the local storage information and the upload speed for the at least one of the plurality of source devices.

21. The non-transitory computer-readable medium of claim 17, wherein the local storage information identifying the data stored on each of the plurality of source devices to be migrated identifies at least one selected from a group consisting of a number of files to be migrated, a number of folders to be migrated, and a size of the data to be migrated.

* * * * *